United States Patent
Tanaka et al.

(10) Patent No.: US 11,493,780 B2
(45) Date of Patent: Nov. 8, 2022

(54) OPTICAL UNIT WITH SHAKE CORRECTION FUNCTION

(71) Applicant: NIDEC CORPORATION, Kyoto (JP)

(72) Inventors: Genki Tanaka, Kyoto (JP); Tomohiro Egawa, Kyoto (JP); Takayuki Iwase, Kyoto (JP); Kazuhiro Sazai, Kyoto (JP); Tsutomu Arai, Nagano (JP); Shinji Minamisawa, Nagano (JP); Takeshi Sue, Nagano (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 17/160,373

(22) Filed: Jan. 28, 2021

(65) Prior Publication Data

US 2021/0240001 A1  Aug. 5, 2021

(30) Foreign Application Priority Data

Jan. 30, 2020  (JP) .............................. JP2020-013922

(51) Int. Cl.
*G02B 27/64* (2006.01)
*G03B 5/00* (2021.01)

(52) U.S. Cl.
CPC ............. *G02B 27/646* (2013.01); *G03B 5/00* (2013.01)

(58) Field of Classification Search
None
See application file for complete search history.

(56) References Cited

U.S. PATENT DOCUMENTS

| 2015/0195460 | A1* | 7/2015 | Yasuda | H04N 5/23287 |
| | | | | 359/557 |
| 2017/0280036 | A1* | 9/2017 | Morinaga | H04N 5/2257 |
| 2020/0304715 | A1* | 9/2020 | Fushida | H04N 5/232 |
| 2021/0318592 | A1* | 10/2021 | Kim | G02B 7/08 |

FOREIGN PATENT DOCUMENTS

| CN | 109212866 A | 1/2019 |
| JP | 2017116861 A | 6/2017 |

* cited by examiner

*Primary Examiner* — Derek S. Chapel
(74) *Attorney, Agent, or Firm* — Hauptman Ham, LLP (57) ABSTRACT

An optical unit with a shake correction function has a shake correction function for correcting a shake of an optical module. The optical unit with a shake correction function includes: a movable body including the optical module; a fixed body disposed outward of the movable body in a radial direction with respect to an optical axis of the optical module; and a support part disposed between the movable body and the fixed body in the radial direction and structured to support the movable body such that the movable body is swingable relative to the fixed body. The movable body and the support part or the support part and the fixed body have, in a pair, a swing mechanism structured to allow the movable body to swing relative to the fixed body. The swing mechanism includes a protruded spherical portion and a recessed spherical portion that is larger in radius of curvature than the protruded spherical portion.

11 Claims, 5 Drawing Sheets

OPTICAL UNIT WITH SHAKE CORRECTION FUNCTION

CROSS-REFERENCE TO RELATED APPLICATIONS

The present invention claims priority under 35 U.S.C. § 119 to Japanese Patent Application No. 2020-013922 filed on Jan. 30, 2020, the entire content of which is incorporated herein by reference.

FIELD OF THE INVENTION

The present disclosure relates to an optical unit with a shake correction function.

BACKGROUND

In the known art, an optical unit to be mounted on a portable terminal or a movement body is provided with a mechanism for correcting a shake by causing a movable body having a lens to swing or turn. Such a mechanism is provided for restraining disturbance of an image photographed when a portable terminal or a movement body is moved.

A conventional imaging device includes a support means for supporting a movable member structured to support at least a part of an imaging means for obtaining an image of an object such that the movable member is swingable around a swing center point on an optical axis of an optical system relative to a fixed member. In the imaging device, the movable member has a supported face that forms a part of a spherical face having a center located on the swing center point. The imaging device also includes a holding member that is movable in an approaching and separating direction so as to change a distance from the fixed member to the supported face. The imaging device also includes a plurality of positional balls that are held with their positions fixed relative to the fixed member, are in point-contact with the supported face, and are different from one another in a circumferential position about the optical axis. The imaging device also includes a plurality of adjustment balls that are held between the supported face and the holding member, are in point-contact with the supported face, and are different from one another in a circumferential position. The supported face forms a part of the spherical face having the center located on the swing center point of the movable body.

According to a configuration in which a support mechanism for supporting a movable body includes a plurality of balls rollable between a fixed body and the movable body, there is a possibility that the balls are handled with difficulty in manufacturing a device. In a case where the movable body having a protruded spherical face supports the balls each having a protruded spherical face such that the balls are rollable, there is a possibility that the structure of the support mechanism becomes complicated.

SUMMARY

An exemplary embodiment of the present disclosure provides an optical unit with a shake correction function for correcting a shake of an optical module. The optical unit with a shake correction function includes a movable body including the optical module. The optical unit with a shake correction function also includes a fixed body disposed outward of the movable body in a radial direction with respect to an optical axis of the optical module. The optical unit with a shake correction function also includes a support part disposed between the movable body and the fixed body in the radial direction and structured to support the movable body such that the movable body is swingable relative to the fixed body. The movable body and the support part or the support part and the fixed body have, in a pair, a swing mechanism structured to allow the movable body to swing relative to the fixed body. The swing mechanism includes a protruded spherical portion and a recessed spherical portion that is larger in radius of curvature than the protruded spherical portion.

The above and other elements, features, steps, characteristics and advantages of the present disclosure will become more apparent from the following detailed description of the preferred embodiments with reference to the attached drawings.

DETAILED DESCRIPTION

An exemplary embodiment of the present disclosure will be described in detail below with reference to the drawings. In the present specification, the term "optical axis direction" refers to a direction that is parallel with an optical axis OA of an optical module 11 illustrated in FIG. 1, and the term "radial direction" refers to a direction that is orthogonal to the optical axis OA with the optical axis OA defined as a center. Also in the present specification, the terms "X-axis", "Y-axis", and "Z-axis" refer to three axes that are orthogonal to one another. The term "+X direction" refers to one side in an X direction extending along the X-axis, and the term "−X direction" refers to the other side in the X direction. The term "+Y direction" refers to one side in a Y direction extending along the Y-axis, and the term "−Y direction" refers to the other side in the Y direction. The term "+Z direction" refers to one side in a Z direction extending along the Z-axis, and the term "−Z direction" refers to the other side in the Z direction. It should be noted that the Z direction is parallel with the optical axis direction. The +Z direction is an object side of the optical module 11. The −Z direction is a counter object side, that is, an image side of the optical module 11. With regard to a positional relationship between one of an orientation, a line, and a plane and any of the others, the term "parallel" involves not only a state in which they do not intersect at all how long they extend, but also a state in which they are substantially parallel with each other. In addition, the terms "perpendicular" and "orthogonal" respectively involve not only a state in which they intersect at 90 degrees, but also a state in which they are substantially perpendicular to each other and a state in which they are substantially orthogonal to each other. In other words, the terms "parallel", "perpendicular", and "orthogonal" each involve a state in which the positional relationship permits an angular deviation to a degree not departing from the scope of the present disclosure.

Figure 1:
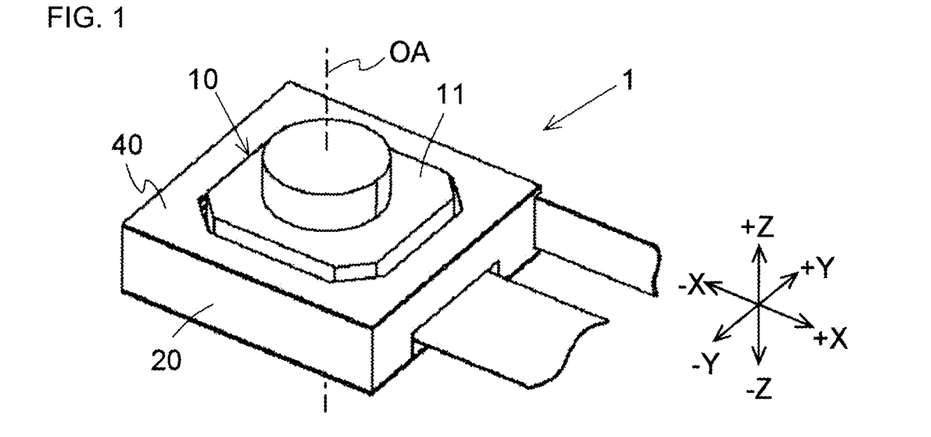
FIG. 1 is a schematic perspective view of an optical unit with a shake correction function according to an embodiment of the present disclosure.
Figure 2:
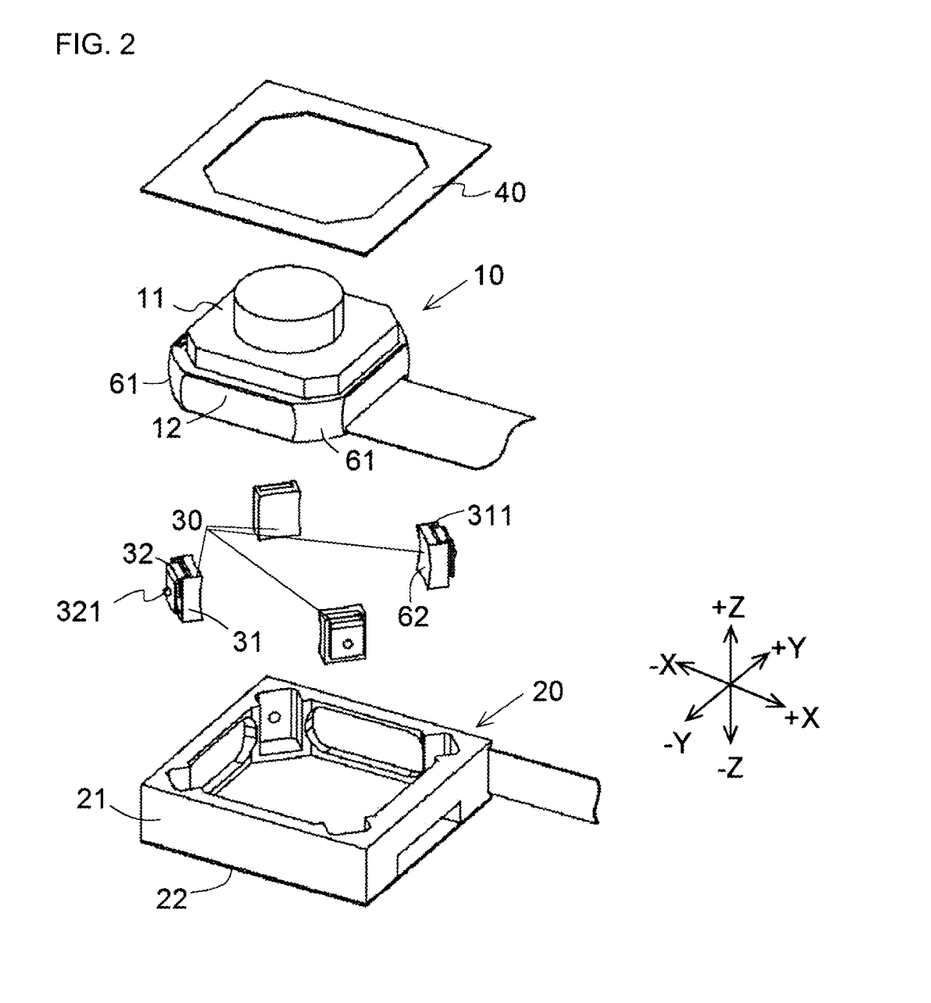
FIG. 2 is an exploded perspective view of the optical unit with a shake correction function according to the embodiment of the present disclosure.

FIG. 1 is a schematic perspective view of an optical unit 1 with a shake correction function according to an embodiment of the present disclosure. FIG. 2 is an exploded perspective view of the optical unit 1 with a shake correction function according to the embodiment of the present disclosure. As illustrated in FIGS. 1 and 2, the optical unit 1 with a shake correction function includes a movable body 10, a fixed body 20, and a support part 30. The optical unit 1 with a shake correction function also includes a top cover 40. The movable body 10 moves relative to the fixed body 20.

Figure 3:
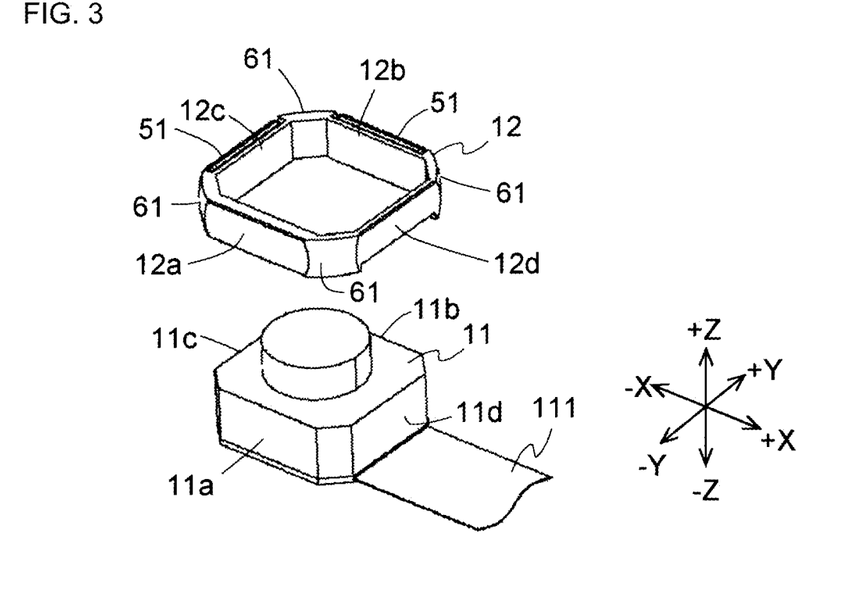
FIG. 3 is an exploded perspective view of a movable body according to the embodiment of the present disclosure.

FIG. 3 is an exploded perspective view of the movable body 10 according to the embodiment of the present disclosure. As illustrated in FIGS. 1 to 3, the movable body 10 includes the optical module 11. In the present embodiment, the optical module 11 has a rectangular shape as seen in Z-directional plan view.

The optical module 11 has a first module outer face 11a and a second module outer face 11b each of which is parallel with the X direction. The first module outer face 11a and the second module outer face 11b face each other with a spacing defined therebetween in the Y direction. The second module outer face 11b is located in the +Y direction with respect to the first module outer face 11a. The optical module 11 also has a third module outer face 11c and a fourth module outer face 11d each of which is parallel with the Y direction. The third module outer face 11c and the fourth module outer face 11d face each other with a spacing defined therebetween in the X direction. The fourth module outer face 11d is located in the +X direction with respect to the third module outer face 11c. The optical module 11 may have any shape, such as a circular shape, as seen in Z-directional plan view.

The optical module 11 includes at least one optical element and an imaging element. The optical element is, for example, a lens. The optical module 11 includes at least one lens. The imaging element may be, for example, a CCD image sensor or a CMOS image sensor. The optical module 11 may have a mechanism structured to drive the optical element. A module-specific flexible printed circuit board 111 is drawn out from a −Z-directional end of the optical module 11. Using the module-specific flexible printed circuit board 111, electric power is supplied to the imaging element, a signal is input to the imaging element, and a signal is output from the imaging element.

As illustrated in FIGS. 2 and 3, the movable body 10 includes a holder 12. The holder 12 is disposed radially outward of the optical module 11. The holder 12 holds the optical module 11. In the present embodiment, the holder 12 is made of a resin. However, the holder 12 may be made of any material in addition to a resin. The holder 12 is a frame body having a rectangular shape as seen in Z-directional plan view. The holder 12 surrounds an outer periphery of the optical module 11.

Specifically, the holder 12 includes a first holder plate-shaped portion 12a and a second holder plate-shaped portion 12b each of which is parallel with the X direction. The first holder plate-shaped portion 12a and the second holder plate-shaped portion 12b face each other with a spacing defined therebetween in the Y direction. The second holder plate-shaped portion 12b is located in the +Y direction with respect to the first holder plate-shaped portion 12a. The holder 12 also includes a third holder plate-shaped portion 12c and a fourth holder plate-shaped portion 12d each of which is parallel with the Y direction. The third holder plate-shaped portion 12c and the fourth holder plate-shaped portion 12d face each other with a spacing defined therebetween in the X direction. The fourth holder plate-shaped portion 12d is located in the +X direction with respect to the third holder plate-shaped portion 12c.

In the state in which the holder 12 holds the optical module 11, the first module outer face 11a faces a radially inner face of the first holder plate-shaped portion 12a. In addition, the second module outer face 11b faces a radially inner face of the second holder plate-shaped portion 12b. In addition, the third module outer face 11c faces a radially inner face of the third holder plate-shaped portion 12c. In addition, the fourth module outer face 11d faces a radially inner face of the fourth holder plate-shaped portion 12d.

The shape of the holder 12 may be changed in accordance with, for example, the shape of the optical module 11. The optical module 11 is fixed to the holder 12. For example, the optical module 11 may be fixed to the holder 12 with an adhesive or by press fitting. In the case where the optical module 11 is fixed to the holder 12 with the adhesive, the adhesive may be interposed between the module outer faces 11a to 11d and the holder plate-shaped portions 12a to 12d in the radial direction.

Figure 4:
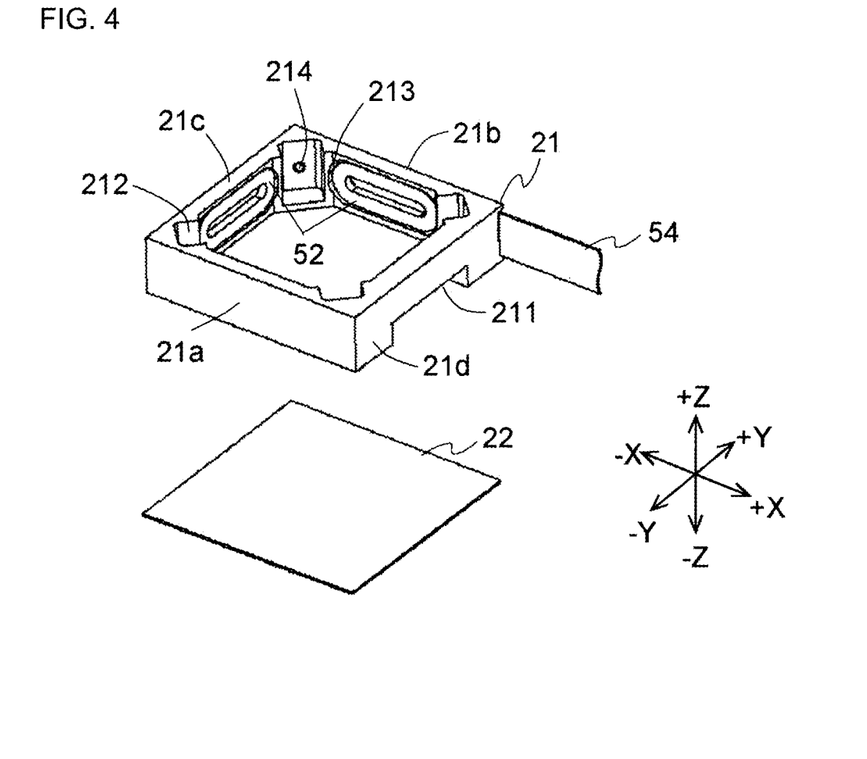
FIG. 4 is an exploded perspective view of a fixed body according to the embodiment of the present disclosure.

FIG. 4 is an exploded perspective view of the fixed body 20 according to the embodiment of the present disclosure. The fixed body 20 is disposed outward of the movable body 10 in the radial direction with respect to the optical axis OA of the optical module 11. As illustrated in FIG. 4, the fixed body 20 includes a fixed frame body 21 and a bottom cover 22.

In the present embodiment, the fixed frame body 21 is made of a resin. However, the fixed frame body 21 may be made of any material in addition to a resin. The fixed frame body 21 has a rectangular shape as seen in Z-directional plan view. Specifically, the fixed frame body 21 includes a first fixed frame body plate-shaped portion 21a and a second fixed frame body plate-shaped portion 21b each of which is parallel with the X direction. The first fixed frame body plate-shaped portion 21a and the second fixed frame body plate-shaped portion 21b face each other with a spacing defined therebetween in the Y direction. The second fixed frame body plate-shaped portion 21b is located in the +Y direction with respect to the first fixed frame body plate-shaped portion 21a. The fixed frame body 21 also includes a third fixed frame body plate-shaped portion 21c and a fourth fixed frame body plate-shaped portion 21d each of which is parallel with the Y direction. The third fixed frame body plate-shaped portion 21c and the fourth fixed frame body plate-shaped portion 21d face each other with a spacing defined therebetween in the X direction. The fourth fixed frame body plate-shaped portion 21d is located in the +X direction with respect to the third fixed frame body plate-shaped portion 21c. The fourth fixed frame body plate-shaped portion 21d includes, on its −Z-directional end face, a cut-out portion 211 that is recessed in the +Z direction. The module-specific flexible printed circuit board 111 is drawn out from the inside of the fixed frame body 21 toward the outside through the cut-out portion 211.

In the state in which the movable body 10 is disposed radially inward of the fixed frame body 21, the first holder plate-shaped portion 12a and the first fixed frame body plate-shaped portion 21a face each other with a spacing defined therebetween in the radial direction, the second holder plate-shaped portion 12b and the second fixed frame body plate-shaped portion 21b face each other with a spacing defined therebetween in the radial direction, the third holder plate-shaped portion 12c and the third fixed frame body plate-shaped portion 21c face each other with a spacing defined therebetween in the radial direction, and the fourth holder plate-shaped portion 12d and the fourth fixed frame body plate-shaped portion 21d face each other with a spacing defined therebetween in the radial direction.

The bottom cover 22 is a plate-shaped body having a rectangular shape as seen in Z-directional plan view. The bottom cover 22 is made of, for example, a resin. However, the bottom cover 22 may be made of a material different from a resin. The bottom cover 22 is fixed to the −Z-directional end face of the fixed frame body 21. A method of fixing the bottom cover 22 may be, for example, bonding with an adhesive, fastening with screws, or the like. The bottom cover 22 is spaced apart from the movable body 10 in the Z direction.

In the present embodiment, the fixed frame body 21 and the bottom cover 22 are separate members; however, the fixed frame body 21 and the bottom cover 22 may be a single member. In other words, the fixed body 20 may have a box shape. In the case where the fixed frame body 21 and the bottom cover 22 are separate members, the fixed frame body 21 may be equal in material to the bottom cover 22 or may be different in material from the bottom cover 22. The fixed body 20 may include only the fixed frame body 21, and does not necessarily include the bottom cover 22.

Figure 5:
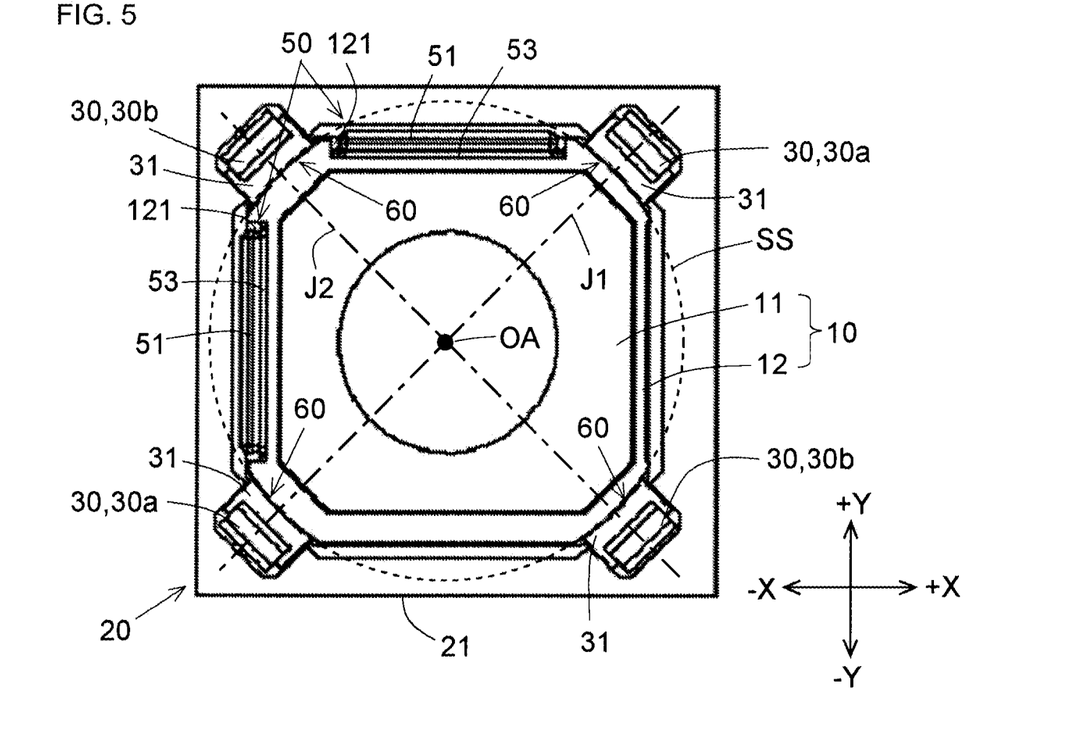
FIG. 5 is a schematic plan view of the optical unit with a shake correction function illustrated in FIG. 1, from which a top cover is detached.

FIG. 5 is a schematic plan view of the optical unit 1 with a shake correction function illustrated in FIG. 1, from which the top cover 40 is detached. FIG. 5 illustrates the optical unit 1 with a shake correction function that is seen from the +Z direction toward the −Z direction. The flexible printed circuit board 111 and a flexible printed circuit board 54 are not illustrated in FIG. 5. As illustrated in FIGS. 2 and 5, the optical unit 1 with a shake correction function includes a plurality of the support parts 30. Specifically, the optical unit 1 with a shake correction function includes four support parts 30. However, the number of support parts 30 is not limited to four. For example, the number of support parts 30 may be three.

The support parts 30 are disposed between the movable body 10 and the fixed body 20 in the radial direction. The support parts 30 support the movable body 10 such that the movable body 10 is swingable relative to the fixed body 20. Specifically, the movable body 10 is supported by the plurality of support parts 30 so as to be swingable relative to the fixed body 20. In the present embodiment, the movable body 10 is supported by the four support parts 30 so as to be swingable relative to the fixed body 20.

The four support parts 30 are respectively disposed on the four corners of the fixed body 20 having a rectangular shape as seen in Z-directional plan view. Specifically, the four support parts 30 are respectively disposed on the four corners of the fixed frame body 21. As illustrated in FIG. 4, the fixed frame body 21 includes, in its four corners, frame body recessed portions 212 that are recessed radially outward in inner faces of the fixed frame body 21. The support parts 30 are respectively accommodated in the frame body recessed portions 212.

The plurality of support parts 30 include a first pair of support parts 30a and a second pair of support parts 30b. The first pair of support parts 30a face each other on a first axis J1 passing the optical axis OA as seen in Z-directional plan view. Specifically, the first pair of support parts 30a face each other with the movable body 10 in between. The second pair of support parts 30b face each other on a second axis J2 as seen in Z-directional plan view. The second axis J2 intersects with the first axis J1 on the optical axis OA. Specifically, the second pair of support parts 30b face each other with the movable body 10 in between. In the present embodiment, the first axis J1 is orthogonal to the second axis J2. However, the first axis J1 is not necessarily orthogonal to the second axis J2.

The movable body 10 supported by the four support parts 30 is turnable around the first axis J1. The movable body 10 is also turnable around the second axis J2. More detailed configurations of the support parts 30 and details of a swing mechanism structured to allow the movable body 10 to swing relative to the fixed body 20 will be described later.

The top cover 40 is disposed on a +Z-directional end face of the fixed body 20. The top cover 40 is fixed to the fixed body 20. Therefore, the top cover 40 may be regarded as a part of the fixed body 20. A method of fixing the top cover 40 may be, for example, bonding with an adhesive, fastening with screws, or the like. In the present embodiment, the top cover 40 has a frame body shape. In the state in which the top cover 40 is attached to the fixed body 20, the movable body 10 partially projects from the top cover 40 in the +Z direction. The top cover 40 has such a shape and size that the top cover 40 does not come into contact with the movable body 10 even when the movable body 10 swings.

The top cover 40 is made of, for example, a resin. However, the top cover 40 may be made of a material different from a resin. The top cover 40 may be equal in material to the fixed frame body 21 and bottom cover 22 constituting the fixed body 20 or may be different in material from the fixed frame body 21 and bottom cover 22 constituting the fixed body 20. The optical unit 1 with a shake correction function does not necessarily include the top cover 40.

As illustrated in FIG. 5, the optical unit 1 with a shake correction function includes a drive mechanism 50 structured to cause the movable body 10 to swing. The drive mechanism 50 is a magnetic drive mechanism. The drive mechanism 50 includes two sets of magnets 51 and coils 52. In the present embodiment, as illustrated in FIGS. 3 and 5, the magnets 51 are held by the holder 12. As illustrated in FIG. 4, the coils 52 are held by the fixed frame body 21. However, the magnets 51 may be held by the fixed frame body 21, and the coils 52 may be held by the holder 12.

Specifically, the second holder plate-shaped portion 12b has, in its radially outer face, a groove 121 that is recessed in the −Y direction. The third holder plate-shaped portion 12c has, in its radially outer face, a groove 121 that is recessed in the +X direction. The magnets 51 each having a rectangular plate shape are respectively disposed in the grooves 121. In the present embodiment, preferably, as illustrated in FIG. 5, yokes 53 are disposed between the magnets 51 and the holder 12 in the radial direction. Each of the second fixed frame body plate-shaped portion 21b and the third fixed frame body plate-shaped portion 21c has a coil-specific through hole 213 penetrating therethrough in the radial direction. The coils 52 are respectively disposed in the coil-specific through holes 213. Specifically, the coils 52 are supported on the coil-specific flexible printed circuit board 54 disposed along the radially outer faces of the second fixed frame body plate-shaped portion 21b and third fixed frame body plate-shaped portion 21c. The coil-specific flexible printed circuit board 54 is held by the fixed frame body 21.

The magnet 51 held by the second holder plate-shaped portion 12b and the coil 52 disposed in the coil-specific through hole 213 in the second fixed frame body plate-shaped portion 21b are provided in a pair. The magnet 51 held by the third holder plate-shaped portion 12c and the coil 52 disposed in the coil-specific through hole 213 in the third fixed frame body plate-shaped portion 21c are also provided in a pair. The optical unit 1 with a shake correction function has a rectangular shape as seen in Z-directional plan view, and includes a set of the magnet 51 and coil 52 disposed on one of two sides parallel with the X direction and a set of the magnet 51 and coil 52 disposed on one of two sides parallel with the Y direction.

Each magnet 51 has a configuration in which magnetic poles on the radially outer face are magnetized different from each other at a central position in the Z direction as a boundary. Each coil 52 is an air-core coil. Each coil 52 has a +Z-directional longer side and a −Z-directional longer side each used as an effective side. Electric power is supplied to each coil 52 through the coil-specific flexible printed circuit board 54.

The sets of magnets 51 and coils 52 may be disposed in a different manner. For example, a set of the magnet 51 and coil 52 may be disposed on each of the four sides of the optical unit 1 with a shake correction function having the rectangular shape as seen in Z-directional plan view. In other words, the optical unit 1 with a shake correction function may include four sets of magnets 51 and coils 52.

The drive mechanism 50 drives the movable body 10, so that the movable body 10 is capable of turning around the first axis J1 and the second axis J2. The optical unit 1 with a shake correction function allows the movable body 10 to swing using this turning. In other words, the optical unit 1 with a shake correction function has a shake correction function for correcting a shake of the optical module 11. Specifically, the optical unit 1 with a shake correction function is capable of correcting a shake around the first axis J1 and a shake around the second axis J2. In other words, the optical unit 1 with a shake correction function is capable of correcting a shake in a pitching direction and a shake in a yawing direction.

For example, The optical unit 1 with a shake correction function is mounted on photographing equipment such as a cell phone with a camera or a drive recorder, optical equipment such as an action camera or a wearable camera, or the like. In the optical equipment, the optical module 11 is tilted at the time of photographing, which may result in disturbance of a photographed image. In order to avoid the disturbance of the photographed image, the optical unit 1 with a shake correction function corrects the tilt of the optical module 11, based on acceleration, angular velocity, shaking amount, and the like detected by a detection means such as a gyroscope. The action camera is mounted on, for example, a movement body such as a helmet, a bicycle, or a radio-controlled helicopter.

Figure 6:
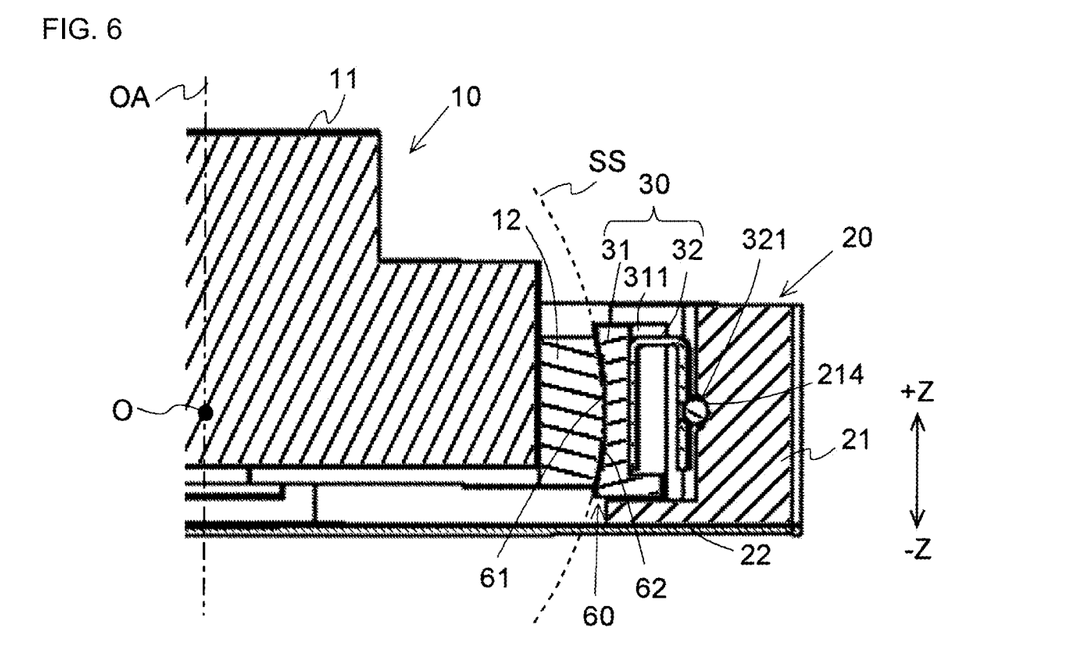
FIG. 6 is a schematic longitudinal sectional view of the optical unit with a shake correction function which is taken at a position of a first axis J1 illustrated in FIG. 5.

FIG. 6 is a schematic longitudinal sectional view of the optical unit 1 with a shake correction function which is taken at a position of the first axis J1 illustrated in FIG. 5. FIG. 6 illustrates a part of the section. As illustrated in FIGS. 2 and 6, each of the support parts 30 includes a swing support member 31 and an elastic member 32. As described above, in the present embodiment, the optical unit 1 with a shake correction function includes the four support parts 30. The four support parts 30 are similar in configuration to one another. In other words, each of the support parts 30 includes the swing support member 31 and the elastic member 32.

In the present embodiment, the swing support member 31 has a rectangular shape as seen in radial plan view. The swing support member 31 is made of a resin, as in the holder 12. However, the swing support member 31 may be made of any material in addition to a resin. A resin as a material for the swing support member 31 may be equal to or different from a resin as a material for the holder 12. In the present embodiment, the swing support member 31 is supported by a bottom face of the fixed body 20. However, the swing support member 31 is not necessarily supported by the bottom face of the fixed body 20. Specifically, the swing support members 31 are supported by the bottom wall that is located in the −Z direction and forms the frame body recessed portions 212.

The swing support member 31 has radial faces one of which faces the holder 12 and is partially in contact with the holder 12. The other radial face of the swing support member 31 is provided with an elastic member accommodating portion 311 that is recessed radially inward. The swing support member 31 holds the elastic member 32 with the elastic member 32 accommodated in the elastic member accommodating portion 311. In other words, the elastic member 32 is fixed to the swing support member 31.

The elastic member 32 is disposed between the swing support member 31 and the fixed body 20 in the radial direction. Specifically, the elastic member 32 is disposed between the swing support member 31 and the fixed frame body 21 in the radial direction. The elastic member 32 is structured to apply an elastic force in the radial direction. Each support part 30 having the elastic member 32 is capable of supporting the movable body 10, using the elastic force in the state in which the movable body 10 floats over the fixed body 20. The elastic member 32 may be made of, for example, a resin. The elastic member 32 may be, for example, a flat spring, a coil spring, or the like. In the present embodiment, the elastic member 32 is a flat spring.

The fixed frame body 21 has a radially inner face in which a recessed face 214 is formed at a position facing a corresponding one of the elastic members 32 in the radial direction. The recessed face 214 is recessed radially outward. The recessed face 214 has, for example, a hemispherical shape. The elastic member 32 has a face that faces the fixed frame body 21 in the radial direction. This face is provided with a protruded face 321 that is in contact with the recessed face 214. The protruded face 321 is protruded radially outward. The protruded face 321 has, for example, a hemispherical shape. The protruded face 321 can be formed in such a manner that, for example, a ball is bonded by welding or with an adhesive to a surface of the elastic member 32. However, the protruded face 321 may be, for example, a surface of a protruded portion formed integrally with the surface of the elastic member 32. In this modification, the elastic member 32 is integrated with the protruded portion formed on the surface of the elastic member 32. The elastic force of the elastic member 32 maintains the state in which the protruded face 321 is fitted in the recessed face 214 of the fixed body 20.

In the present embodiment, the fixed frame body 21 has the recessed face 214, and the elastic member 32 has the protruded face 321. However, the members having the recessed face and protruded face may be different from those in the present embodiment. In other words, the fixed frame body 21 may have the protruded face, and the elastic member 32 may have the recessed face.

Specifically, the elastic members 32 of the first pair of support parts 30*a* apply elastic forces in the direction along the first axis J1. The elastic members 32 of the second pair of support parts 30*b* apply elastic forces in the direction along the second axis J2. The recessed faces 214 that are in contact with the protruded faces 321 of the elastic members 32 of the first pair of support parts 30*a* are located on the first axis J1. The recessed faces 214 that are in contact with the protruded faces 321 of the elastic members 32 of the second pair of support parts 30*b* are located on the second axis J2. The first axis J1 and the second axis J2 pass a swing center O. The swing center O may be, for example, the center of gravity of the movable body 10, but may be located at a position deviating from the center of gravity.

According to the present embodiment, the four elastic members 32 are capable of applying, to the movable body 10, forces directed to the swing center O of the movable body 10, so that the position of the swing center O of the movable body 10 can be stabilized. The elastic members 32 do not necessarily apply elastic forces in the radial direction. For example, the elastic members 32 of the first pair of support parts 30*a* may apply elastic forces in a direction corresponding to the radial direction that is inclined to the +Z direction or the −Z direction. In addition, the elastic members 32 of the second pair of support parts 30*b* may apply elastic forces in a direction that is inclined oppositely in the Z direction to the case of the first pair of support parts 30*a*. However, any configuration may be employed as long as the elastic forces from the elastic members 32 of the first pair of support parts 30*a* and the elastic forces from the elastic members 32 of the second pair of support parts 30*b* are combined to eventually generate forces directed to the swing center O.

Figure 7:
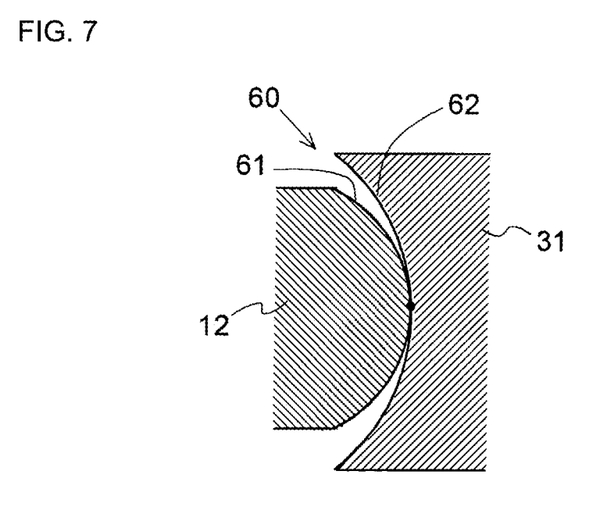
FIG. 7 is a schematic diagram illustrating, in an enlarged manner, a portion of a swing mechanism illustrated in FIG. 6.

The movable body 10 and each support part 30 or each support part 30 and the fixed body 20 have, in a pair, a swing mechanism 60 structured to allow the movable body 10 to swing relative to the fixed body 20. FIG. 7 is a schematic diagram illustrating, in an enlarged manner, a portion of the swing mechanism 60 illustrated in FIG. 6. The swing mechanism 60 includes a protruded spherical portion 61 and a recessed spherical portion 62. The recessed spherical portion 62 is larger in radius of curvature than the protruded spherical portion 61.

With this configuration, one of the protruded spherical portion 61 and the recessed spherical portion 62 is moved relative to the other while being in contact with the other, so that the movable body 10 is capable of swinging relative to the fixed body 20. With this configuration, the movable body 10 is capable of swinging relative to the fixed body 20 without use of a mechanism structured to allow the movable body 10 to swing by a combination of a protruded spherical face with a ball. With this configuration, the structure is simpler than that in a case of forming a swing mechanism by a combination of a protruded spherical shape with a protruded spherical shape. With this configuration, the radius of curvature of the recessed spherical portion 62 is larger than the radius of curvature of the protruded spherical portion 61. Therefore, drive torque at the time of moving the movable body 10 can be reduced by decreasing a contact area between the protruded spherical portion 61 and the recessed spherical portion 62.

In the present embodiment, as illustrated in FIGS. 5 and 6, the movable body 10 and each support part 30 have the swing mechanism 60 in a pair. One of the movable body 10 and each support part 30 includes the protruded spherical portion 61, and the other includes the recessed spherical portion 62. For example, the swing support member 31 includes the recessed spherical portion 62 or the protruded spherical portion, and is in contact with the protruded spherical portion 61 or the recessed spherical portion of the movable body 10. With this configuration, the fixed body 20 does not constitute the swing mechanism 60. Therefore, each support part 30 can be easily positioned with respect to the fixed body 20, so that the movable body 10 is capable of swinging stably.

In the present embodiment, the movable body 10 includes the holder 12. Therefore, the holder 12 includes the protruded spherical portion 61 or the recessed spherical portion. With this configuration, the holder 12 including the protruded spherical portion 61 or the recessed spherical portion can be retrofitted to the optical module 11, leading to improved degree of freedom in design, for example. The holder 12 may be omitted, and the optical module 11 may include the protruded spherical portion or the recessed spherical portion.

Specifically, in the present embodiment, the movable body 10 includes the protruded spherical portions 61 protruded radially outward. More specifically, as illustrated in FIGS. 3, 6, and 7, the holder 12 includes the protruded spherical portions 61. As illustrated in FIG. 3, the holder 12 includes the protruded spherical portions 61 corresponding to the radially outer faces on the four corners.

Also in the present embodiment, as illustrated in FIGS. 2, 6, and 7, the swing support members 31 include the recessed spherical portions 62 that are recessed in the radial direction. Each recessed spherical portion 62 is provided on one of two radial faces, which faces the holder 12, of the corresponding swing support member 31. The entire face, which faces the holder 12, of the swing support member 31 corresponds to the recessed spherical portion 62. As illustrated in FIG. 6, the recessed spherical portion 62 has such a shape that a part of a spherical face SS with the swing center O of the movable body 10 defined as a center is transferred. As illustrated in FIG. 5, the recessed spherical portion 62 of the swing support member 31 of each of the four support parts 30 has such a shape that a part of the same spherical face SS is transferred in accordance with a position at which each support part 30 is disposed.

According to the present embodiment, the protruded spherical portions 61 of the movable body 10 are capable of sliding while being in contact with the recessed spherical portions 62 of the swing support members 31. In the present embodiment, the recessed spherical portions 62 are larger in radius of curvature than the protruded spherical portions 61. As illustrated in FIG. 7, the protruded spherical portions 61 are in point-contact with the recessed spherical portions 62. Specifically, the protruded spherical portions 61 are in contact with the recessed spherical portions 62 at one position. It is thus possible to reduce drive torque at the time of moving the movable body 10 because of a small contact area between each protruded spherical portion 61 and the corresponding recessed spherical portion 62. The point-contact may be made at multiple positions.

It should be noted that grease may be applied between the protruded spherical portions 61 and the recessed spherical portions 62 in the radial direction in order to reduce friction. In this sense, the protruded spherical portions 61 may be in direct contact with or in indirect contact with the recessed spherical portions 62. In addition, a coating layer for improving sliding performance or a coating layer for improving wear resistance may be provided for at least one of the protruded spherical portions 61 and the recessed spherical portions 62.

In the optical unit 1 with a shake correction function, for example, when the drive mechanism 50 drives the movable body 10 such that the movable body 10 turns around the first axis J1, the swing mechanisms 60 operate as follows. When the movable body 10 receives a force to turn around the first axis J1, the movable body 10 turns around the first axis J1 in the state in which the protruded spherical portions 61 facing the recessed spherical portions 62 of the first pair of support parts 30*a* are in contact with the recessed spherical portions 62 while keeping their Z-directional positions almost constant. When the movable body 10 turns as described above, the protruded spherical portions 61 facing the recessed spherical portions 62 of the second pair of support parts 30*b* change their Z-directional positions while sliding in the state in which the protruded spherical portions 61 are in contact with the recessed spherical portions 62. In other words, when the drive mechanism 50 applies a specific driving force, the swing mechanisms 60 allow the movable body 10 to swing around the first axis J1.

In the optical unit 1 with a shake correction function, for example, when the drive mechanism 50 drives the movable body 10 such that the movable body 10 turns around the second axis J2, the swing mechanisms 60 operate as follows. When the movable body 10 receives a force to turn around the second axis J2, the movable body 10 turns around the second axis J2 in the state in which the protruded spherical portions 61 facing the recessed spherical portions 62 of the second pair of support parts 30*b* are in contact with the recessed spherical portions 62 while keeping their Z-directional positions almost constant. When the movable body 10 turns as described above, the protruded spherical portions 61 facing the recessed spherical portions 62 of the first pair of support parts 30*a* change their Z-directional positions while sliding in the state in which the protruded spherical portions 61 are in contact with the recessed spherical portions 62. In other words, when the drive mechanism 50 applies a specific driving force, the swing mechanisms 60 allow the movable body 10 to swing around the second axis J2.

The optical unit 1 with a shake correction function may have a configuration for restricting a turn of the movable body 10 around the optical axis OA. In other words, the optical unit 1 with a shake correction function may have a configuration for restricting a swing of the movable body 10 in a rolling direction. The configuration for restricting a swing in the rolling direction may be, for example, a configuration in which, when the movable body 10 starts to turn around the optical axis OA, a projection formed on one of the fixed body 20 and the movable body 10 hinders the turn in such a manner that the projection comes into contact with the other. However, the optical unit 1 with a shake correction function may have a configuration in which the movable body 10 positively swings in the rolling direction, by adding a drive mechanism allowing the movable body 10 to swing in the rolling direction.

The foregoing description exemplifies the movable body 10 structured to swing around the two axes, that is, the first axis J1 and the second axis J2. However, which axis the movable body 10 swings around can be changed by adjusting a driving force which the drive mechanism 50 applies to the movable body 10. For example, the movable body 10 may be structured to swing around two axes, that is, the X-axis and the Y-axis passing the swing center O. The four support parts 30 are not necessarily spaced by 90° apart from one another in the circumferential direction about the optical axis OA. For example, three support parts 30 may be spaced by 120° apart from one another in the circumferential direction about the optical axis OA.

Figure 8:
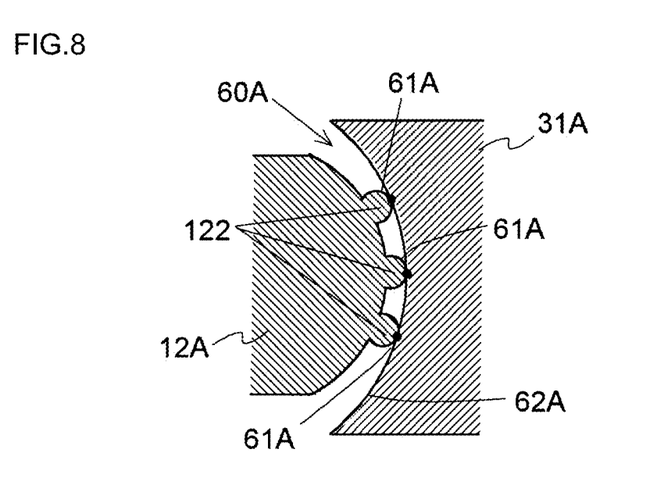
FIG. 8 is a schematic diagram illustrating a swing mechanism according to a first modification.

FIG. 8 is a schematic diagram illustrating a swing mechanism 60A according to a first modification. In the first modification, a holder 12A includes, on four corners, a plurality of holder protruded portions 122 each having a protruded spherical portion 61A that is smaller in radius of curvature than a recessed spherical portion 62A of each swing support member 31A. In the present modification, the number of holder protruded portions 122 is three; however, this number may be changed.

In the present modification, the holder protruded portions 122 and the holder 12 are a single member. In other words, the holder protruded portions 122 are integrated with the holder 12. However, protruded spherical portions 61A may be formed in such a manner that members separated from the holder 12 are fixedly bonded to the holder 12. For example, the protruded spherical portions 61A may be formed in such a manner that spherical bodies are fixedly bonded to a radially outer face of the holder 12.

In the first modification, each recessed spherical portion 62A is in point-contact with the corresponding protruded spherical portions 61A at multiple positions. It is thus possible to enhance a force to support a movable body 10 while reducing drive torque by decreasing a contact area between each protruded spherical portion 61A and the corresponding recessed spherical portion 62A.

Figure 9:
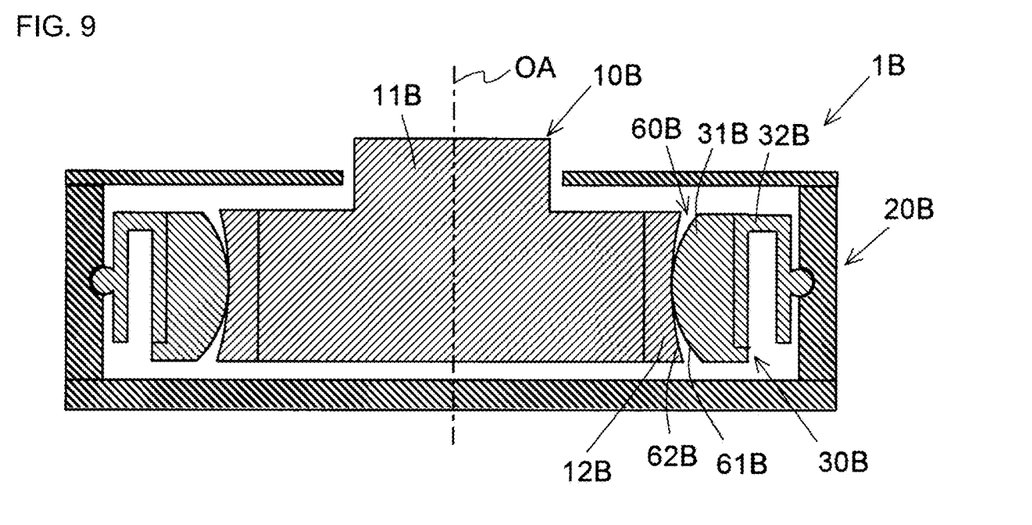
FIG. 9 is a schematic longitudinal sectional view illustrating a configuration of an optical unit with a shake correction function according to a second modification.

FIG. 9 is a schematic longitudinal sectional view illustrating a configuration of an optical unit 1B with a shake correction function according to a second modification. FIG. 9 is a longitudinal sectional view taken at a position similar to the position in FIG. 6. Also in the present modification, a movable body 10B and each support part 30B have a swing mechanism 60B in a pair. In the present modification, the movable body 10B includes recessed spherical portions 62B that are recessed radially inward. Specifically, the recessed spherical portions 62B are provided in a holder 12B. More specifically, the recessed spherical portions 62B are respectively provided on four corners of the holder 12B having a rectangular frame body shape. The recessed spherical portions 62B may be provided on an optical module 11B. In this case, the movable body 10B does not necessarily include the holder 12B.

Also in the present modification, the support parts 30B supporting the movable body 10B such that the movable body 10B is swingable relative to a fixed body 20B are respectively disposed on four corners of the fixed body 20B. Each support part 30B includes a swing support member 31B and an elastic member 32B that is held by the swing support member 31B and is structured to apply an elastic force in the radial direction. The swing support member 31B includes a protruded spherical portion 61B that is protruded radially inward. The protruded spherical portion 61B is formed on an entire face of the swing support member 31B facing the holder 12B.

According to the present modification, the movable body 10B is capable of swinging in such a manner that the recessed spherical portions 62B of the movable body 10B slide while being in contact with the protruded spherical portions 61B of the swing support members 31B. The recessed spherical portions 62B are larger in radius of curvature than the protruded spherical portions 61B. Therefore, drive torque at the time of moving the movable body 10B can be reduced by decreasing a contact area between each protruded spherical portion 61B and the corresponding recessed spherical portion 62B.

Figure 10:
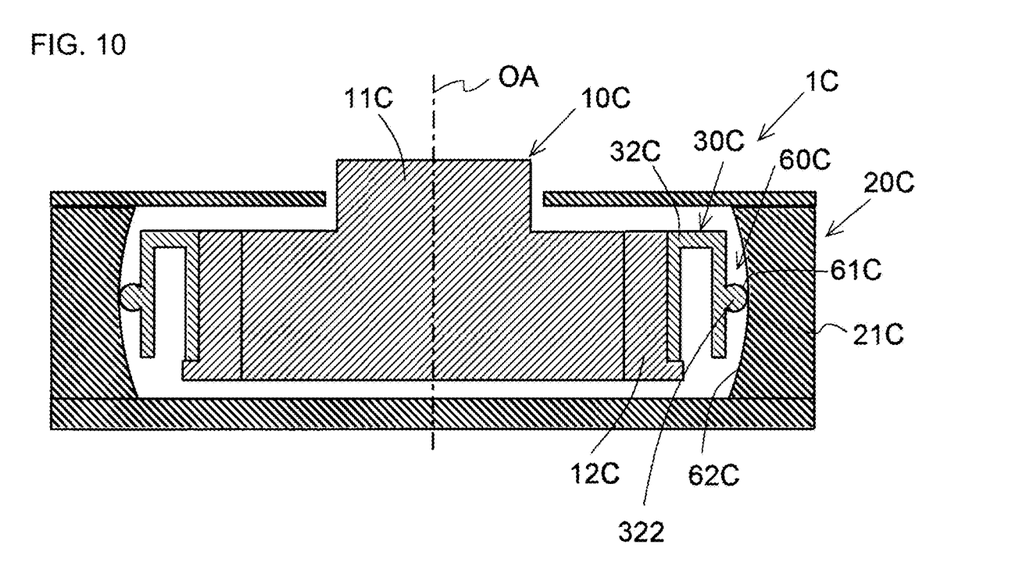
FIG. 10 is a schematic longitudinal sectional view illustrating a configuration of an optical unit with a shake correction function according to a third modification.

FIG. 10 is a schematic longitudinal sectional view illustrating a configuration of an optical unit 1C with a shake correction function according to a third modification. FIG. 10 is a longitudinal sectional view taken at a position similar to the position in FIG. 6. In the present modification, each support part 30C and a fixed body 20C have a swing mechanism 60C in a pair. Each support part 30C swings relative to the fixed body 20C in conjunction with a movable body 10C. With this configuration, the optical unit 1C with a shake correction function, for causing the movable body 10C to swing relative to the fixed body 20C and correcting a shake of an optical module 11C can be structured with a simple configuration.

In the present modification, each support part 30C is fixed to a holder 12C of the movable body 10C, the holder 12C having a rectangular frame body shape. For example, the support parts 30C are respectively disposed on the four corners of the holder 12C. Each support part 30C includes an elastic member 32C and a protruded spherical portion 61C. The elastic member 32C is fixed to the movable body 10C.

Specifically, the elastic member 32C is fixed to the holder 12C. The elastic member 32C may be fixed to the optical module 11C. In this case, the movable body 10C does not necessarily include the holder 12C. The elastic member 32C applies an elastic force in the radial direction. The elastic member 32C may be, for example, a flat spring or a coil spring. In the present modification, the elastic member 32C is a flat spring.

The protruded spherical portion 61C is provided on the elastic member 32C. The protruded spherical portion 61C is protruded radially outward. In the present modification, the elastic member 32C includes an elastic member protruded portion 322 that is protruded radially outward. The protruded spherical portion 61C is a part of the elastic member protruded portion 322. The elastic member protruded portion 322 and the elastic member 32C may be a single member or separate members.

The fixed body 20C includes recessed spherical portions 62C that are recessed radially outward. In the present modification, the fixed body 20C includes a fixed frame body 21C having a rectangular frame body shape, as in the foregoing embodiment. The recessed spherical portions 62C are respectively provided on radially inner faces on the four corners of the fixed frame body 21C. For example, each recessed spherical portion 62C extends from a +Z-directional end to a −Z-directional end of the fixed frame body 21C in the Z direction. Also in the present modification, the recessed spherical portions 62C are larger in radius of curvature than the protruded spherical portions 61C.

According to the present modification, the movable body 10C is capable of swinging relative to the fixed body 20C in such a manner that the protruded spherical portion 61C of each support part 30C movable in conjunction with the movable body 10C slides while being in contact with the corresponding recessed spherical portion 62C of the fixed body 20C. The recessed spherical portions 62C are larger in radius of curvature than the protruded spherical portions 61C. Therefore, drive torque at the time of moving the movable body 10C can be reduced by decreasing a contact area between each protruded spherical portion 61C and the corresponding recessed spherical portion 62C. In the present modification, the swing support members 31 in the foregoing embodiment can be omitted, leading to reduction in parts count of the optical unit 1C with a shake correction function.

The present disclosure is widely applicable to, for example, optical equipment.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. An optical unit with a shake correction function for correcting a shake of an optical module, the optical unit comprising:
    a movable body including the optical module;
    a fixed body disposed outward of the movable body in a radial direction with respect to an optical axis of the optical module; and
    a support part disposed between the movable body and the fixed body in the radial direction and structured to support the movable body such that the movable body is swingable relative to the fixed body,
    wherein
    the movable body and the support part or the support part and the fixed body have, in a pair, a swing mechanism structured to allow the movable body to swing relative to the fixed body,
    the swing mechanism includes:
        a protruded spherical portion; and
        a recessed spherical portion that is larger in radius of curvature than the protruded spherical portion,
    the movable body and the support part have the swing mechanism in a pair, and
    one of the movable body and the support part includes the protruded spherical portion, and the other includes the recessed spherical portion.

2. The optical unit according to claim 1, wherein
    the protruded spherical portion is in point-contact with the recessed spherical portion.

3. The optical unit according to claim 2, wherein
    the recessed spherical portion is in point-contact with the protruded spherical portion at multiple positions.

4. The optical unit according to claim 1, wherein the support part includes:
    a swing support member including the recessed spherical portion or the protruded spherical portion, the swing support member being in contact with the protruded spherical portion or the recessed spherical portion of the movable body; and
    an elastic member fixed to the swing support member and disposed between the swing support member and the fixed body in the radial direction.

5. The optical unit according to claim 4, wherein
    the movable body includes the protruded spherical portion protruded radially outward, and
    the swing support member includes the recessed spherical portion recessed radially outward.

6. The optical unit according to claim 4, wherein
    the movable body includes the recessed spherical portion recessed radially inward, and
    the swing support member includes the protruded spherical portion protruded radially inward.

7. The optical unit according to claim 4, wherein
    the movable body includes a holder disposed radially outward of the optical module and structured to hold the optical module, and
    the holder includes the protruded spherical portion or the recessed spherical portion.

8. The optical unit according to claim 1, wherein
the movable body includes the protruded spherical portion protruded radially outward, and
the swing support member includes the recessed spherical portion recessed radially outward.

9. The optical unit according to claim 1, wherein
the movable body includes the recessed spherical portion recessed radially inward, and
the swing support member includes the protruded spherical portion protruded radially inward.

10. The optical unit according to claim 1, wherein
the movable body includes a holder disposed radially outward of the optical module and structured to hold the optical module, and
the holder includes the protruded spherical portion or the recessed spherical portion.

11. An optical unit with a shake correction function for correcting a shake of an optical module, the optical unit comprising:
a movable body including the optical module;
a fixed body disposed outward of the movable body in a radial direction with respect to an optical axis of the optical module; and
a support part disposed between the movable body and the fixed body in the radial direction and structured to support the movable body such that the movable body is swingable relative to the fixed body,
wherein
the movable body and the support part or the support part and the fixed body have, in a pair, a swing mechanism structured to allow the movable body to swing relative to the fixed body,
the swing mechanism includes:
a protruded spherical portion; and
a recessed spherical portion that is larger in radius of curvature than the protruded spherical portion,
the support part and the fixed body have the swing mechanism in a pair,
the support part swings relative to the fixed body in conjunction with the movable body,
the support part includes:
an elastic member fixed to the movable body; and
the protruded spherical portion provided on the elastic member and protruded radially outward, and
the fixed body includes the recessed spherical portion recessed radially outward.

* * * * *